United States Patent [19]

Sheahan

[11] Patent Number: 5,193,326
[45] Date of Patent: Mar. 16, 1993

[54] METHOD OF USING A FASTENER TO SECURE A MULTIPLE LAYERED ROOF, TO REPAIR A ROOF, AND TO DETECT LEAKS IN A ROOF

[75] Inventor: James P. Sheahan, Midland, Mich.

[73] Assignee: J. P. Sheahan & Associates, Midland, Mich.

[21] Appl. No.: 767,675

[22] Filed: Sep. 30, 1991

Related U.S. Application Data

[62] Division of Ser. No. 440,705, Nov. 24, 1989, Pat. No. 5,080,542.

[51] Int. Cl.$^5$ .......................... E04B 1/38; E04G 23/00
[52] U.S. Cl. ..................................... 52/746; 52/747; 52/698; 52/741.4
[58] Field of Search ............... 52/746, 747, 698, 410, 52/741

[56] References Cited

U.S. PATENT DOCUMENTS

| | | | |
|---|---|---|---|
| 4,441,295 | 4/1984 | Kelly | 52/746 X |
| 4,493,175 | 1/1985 | Coppola, Jr. | 52/410 |
| 4,528,789 | 7/1985 | Simpson | 52/410 X |
| 4,602,468 | 7/1986 | Simpson | 52/410 |
| 4,620,402 | 11/1986 | Beneze | 52/410 |
| 4,651,490 | 3/1987 | Marston | 52/410 |
| 4,834,600 | 5/1989 | Lemke | 52/410 X |
| 5,080,542 | 1/1992 | Sheahan | 411/34 |

Primary Examiner—David A. Scherbel
Assistant Examiner—Robert Canfield
Attorney, Agent, or Firm—Robert L. McKellar

[57] ABSTRACT

This invention deals with a device which is useful for the securing of roof structures, especially laminar type roof structures wherein an integral, obstensibly waterproof, covering is used as part of the laminar structure. It also deals with a unique method of detecting leaks in roofing structures which allows the location of such leaks with a certain preciseness by using the fastening devices of this invention as points of reference.

4 Claims, 3 Drawing Sheets

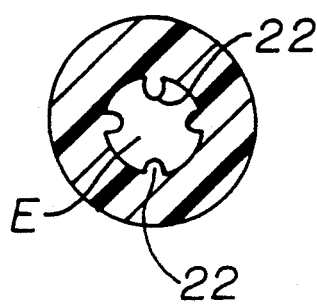
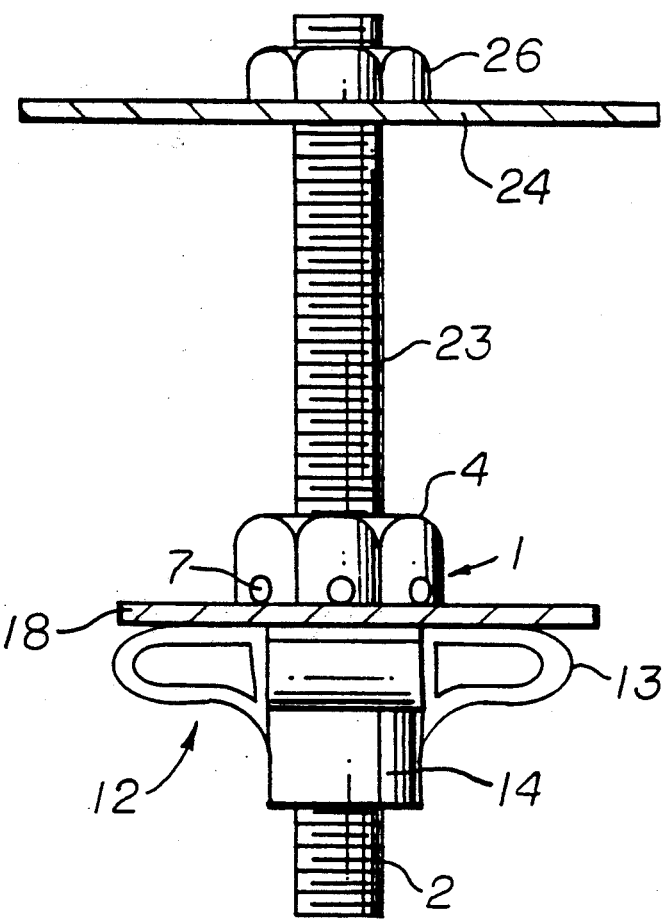
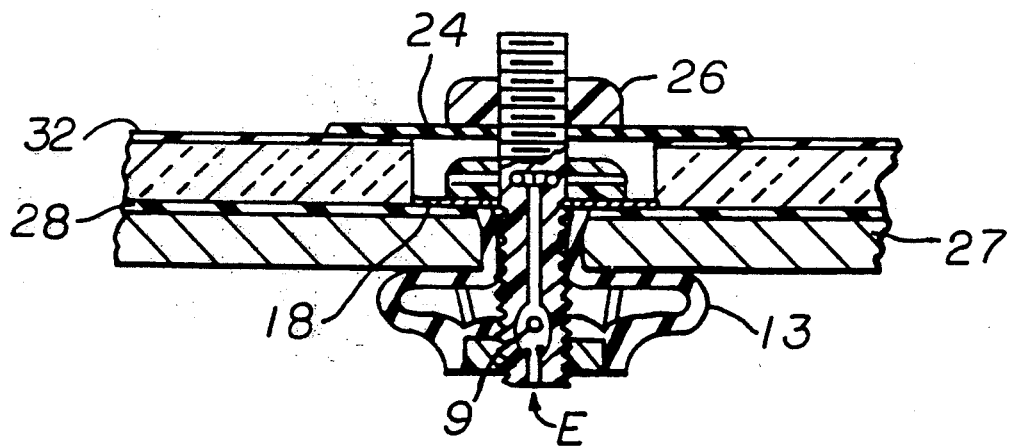

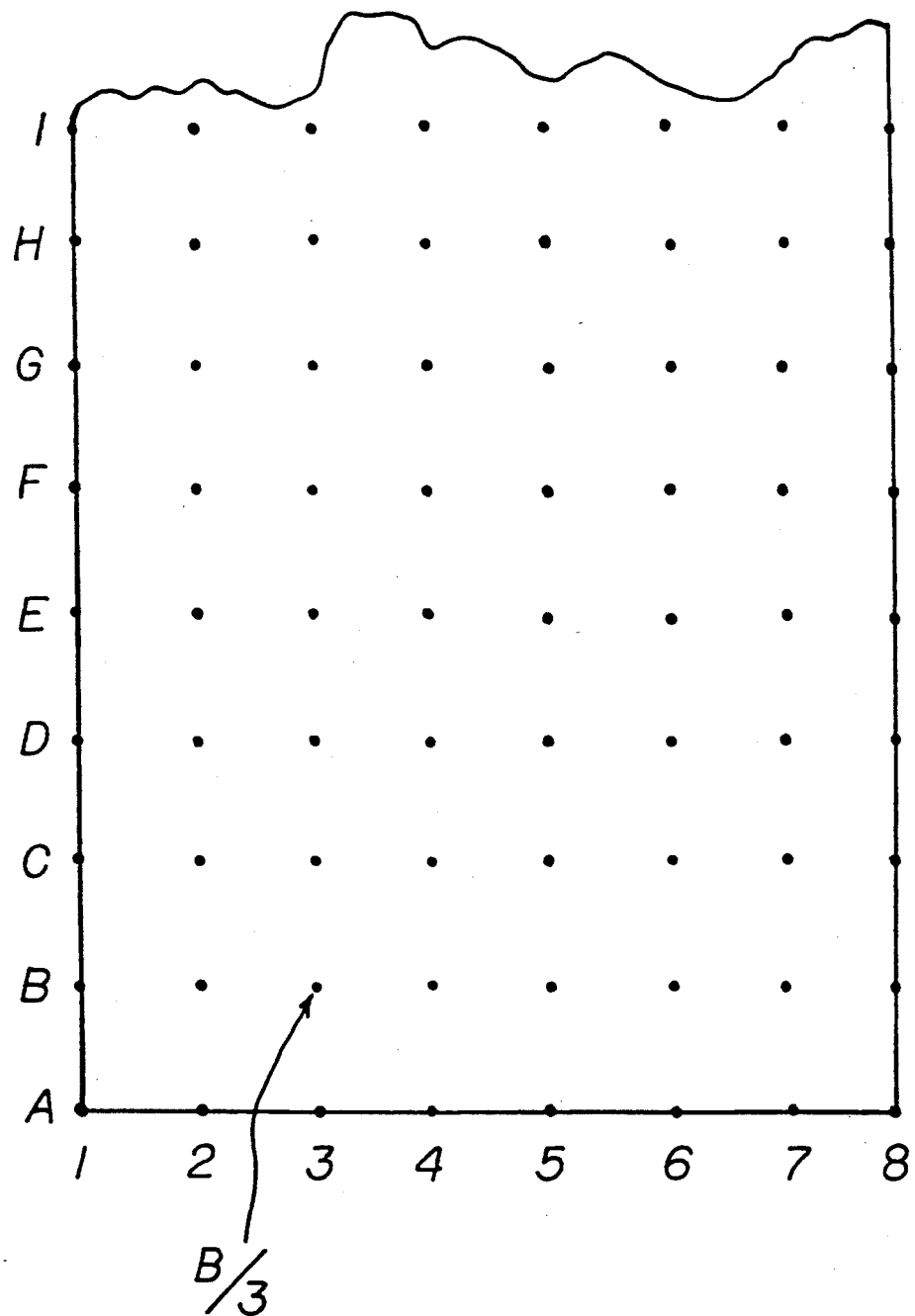

METHOD OF USING A FASTENER TO SECURE A MULTIPLE LAYERED ROOF, TO REPAIR A ROOF, AND TO DETECT LEAKS IN A ROOF

This is a divisional of copending application Ser. No. 07/440,705, filed on Nov. 24, 1989, now U.S. Pat. No. 5,080,542.

This invention deals with a device which is useful for the securing of roof structures, especially laminar type roof structures wherein an integral, obstensibly waterproof, covering is used as part of the laminar structure. It also deals with a unique method of detecting leaks in roofing structures which allows the location of such leaks with a certain preciseness by using the fastening devices of this invention as points of reference.

The general type of fastening devices that make up a part of this invention are well-known in the art. Sometimes, these devices are called anchor bolts. Obviously, anchor bolts are found in more than just the roofing industry, but the fastening devices of this invention, because of their novel features are used primarily in the laminar roof industry where leakage through essentially flat, laminar roofing is a major problem, especially in commercial buildings having large surface roof areas and, there is a major problem with holding such roofs in place because they are subjected to the effects of wind, which causes billowing of the integral top covering of the roof system and subsequent loosening of prior art hold down devices, and because of the inherent corrosion of the prior art hold down devices to the extent that they no longer can grip the roof decks and maintain their holding power.

BACKGROUND OF THE INVENTION

The devices of this invention are intended to improve the fastening of roof systems to decks in those cases where the fasteners penetrate the deck. Examples of such decks are plywood. Tectum (shredded wood with a cement binder), hollow concrete panels, and metal decks, the use of metal decks being the most preferred. Metal decks are normally twenty two gauge steel and primarily, metal anchor screws which are used to hold down roof systems, are manufactured out of various metal alloys in an attempt to provide strength, self tapping capabilities and provide some corrosion resistance. The fasteners are generally stronger than the substrate to which they are applied. Failure of these devices occurs in the pull-out from the substrate rather than destruction of the screw itself, which screws are nominally three sixteenths of an inch in diameter for most roof systems. A secondary weakness of a roof system is at the top side where the materials, such as insulation or roofing membranes tear through the heads and washers of such devices causing the materials to be torn off the top of the roof system. As indicated supra, one advantage of metal screws is that they are self-tapping which means they can be installed in one operation, that is, the entire roof system is laid down in its multiple layers and then fastened with one of the screw type devices by penetrating from the top layer and forcing the screw down into the roof deck where it is screwed into the roof deck for securing the entire roof system. The environment into which these screws are applied can be detrimental to them. For example, installing a roofing system over an existing roof system traps moisture which creates a wet environment setting up rusting and galvanic corrosion of the screws. Further, in a new roof system where subsequent leakage creates a wet environment, there is also set up the same type of rusting and galvanic corrosion environment. The fasteners, even if they are manufactured from stainless steel, do not resist the corrosive atomospheres found within built up roof systems. Also, in those situations where the fasteners are covered with coatings to protect them, the protective coatings tend to be scraped off when they pass through the metal deck and this scraping is more egregious when they have to be passed through an existing built-up roof topped with a stone layer. Further, the protective coating is worn away over short periods of time owing to the constant movement of the roof system due to wind and thermal expansion and contraction. This leaves the metal of the screw vulnerable to corrosion.

Even for those screws that do not require a protective coating the metal deck itself is cut through during installation, exposing the thickness of the metal deck to corrosion with the same subsequent result that is, pull-out of the fastener from the deck.

When considering the screws of small diameter such as the small metal screws currently used in prior art systems the pull-out strength is essentially about 500 pounds regardless of the relative diameter of the screw. This translates directly to the ultimate strength of the system and is the maximum strength of the decking since only one thread of the screw is engaged in the nominally twenty two gauge deck. Metal decks of this gauge have an ultimate strength of two thouand pounds and in order to take advantage of this strength to hold the roof system down, there should be a spreading of the load on the underside of the deck to about at least a three quarter inch diameter interface of the hold down device with the underside of the deck. Thus, in the roofing industry, the five hundred pound limit has become the design criteria for determining the quantity of fasteners and the placement of fasteners to hold the roofing systems in place. The normal pull-out resistance requirements are related to loadings of sixty to ninety pounds per square foot. Ninety is becoming the most sought after requirement with some requirements being raised to one hundred and twenty pounds per square foot. By way of example, and using a pull-out strength of five hundred pounds and the requirement for ninety pounds per square foot the area of roof that can be held down per fastener, on average, is four to five square feet. Typically this means that fastener placement patterns which require eight fasteners are used to hold the systems down which are nominally four feet by eight feet, or thirty two square feet. For roofing membranes which are nominally five feet wide, the nailing pattern at the ends of the runs, and the nails applied on one foot centers throughout the membrane, provide the ability of using about five square feet per fastener. Most often the requirement is to fasten both the insulation and the membrane so that the fastener design approaches one per three square feet.

The fasteners of the instant invention have higher pull-out strengths, that is about two thousand pounds or about four times the five hundred pounds for the devices of the prior art. One fastening device, especially useful in the laminar roofing industry, is a piercing type of screw device, which is made to pierce the lamelle of the roof structure by screwing it downwardly into the metal roof deck. These type of devices all rely on spiral threads. Eventhough these devices are made with a minimum pitch in the thread, still only one portion of the thread comes into contact with the surface around the pierced hole of the metal deck. The use of this type of device gives a "can opener" effect whereby the screw is pointed and when it pierces the metal, it cleaves away the metal. They are completely devoid of any annular rings or toggles, or the like, around the bottom to help secure them in the hole. Also there is a problem with having the length of such a device correspond exactly with the thickness of the laminar roof in order to get the maximum securing strength.

Fastening devices having the configuration of anchor bolts are also generally known which consist of a bolt or stem which is treaded, has a cap or head portion on one end and a nut or toggle on the opposite end whereby after insertion through an opening the nut or toggle is screwed down on the threaded bolt or stem and the device tightens from both ends to secure the object between them. In a rather sophisticated arrangement of one such device, such as that found in U.S. Pat. No. 3,667,340 to Daniel A. Black, et al., there is illustrated a fastening device in the nature of a rivet wherein a tubular sleeve has a head on one end bearing against one side of the work piece, and an internally threaded tail. A screw is extended through the head and the sleeve is threaded into said tail and is so positioned that the screw head is initially spaced from the head of the sleeve; the shank of the sleeve is slotted and the resulting strips are notched internally at about the middle so that by turning the screw the tail travels toward the head and the strips are folded flat against the other face of the workpiece. In the method of making this fastener, after the hollow rivet with the head is formed it is positioned in a die and cutting blades are forced through the wall of the sleeve to cut parallel longitudinal slots dividing the middle portion of the sleeve into strips of arcuate cross section, then the sleeve is held in a die while a tool is inserted and rotated to cut a groove into the strips for facilitating the collapsing of the sleeve. Then the screw is inserted into the sleeve and the tail of the sleeve is pressed or swaged into the screw to form the internal thread in the tail and hold the screw. The shank between the sleeve head and the adjacent ends of the slots is approximately equal to the minimum thickness in which the fastener is used. The sleeve head has a recess in both faces to accommodate suitable washers. Thus, with reference to FIG. 12 of that patent it can be seen how the tubular rivet works as it is fastened in place. This device differs from the instant invention in that the materials are made from metal, albeit ductile metals, which means that the device is not reusable unless a new slotted sleeve is used each time. Furthermore, once the ductile material takes the configuration of the bottom surface of the work piece, there is no way that the device can be adjusted up or down and still give the maximum of security.

There are other significant features of the inventive device of the instant invention which makes it different from the patented device which differences will be set forth infra.

The fasteners of the instant invention are non-corroding. The fasteners of the instant invention protect the exposed metal surface of the metal deck to prevent corroding. The fasteners of the instant invention have backout and pullout resistance that are not found in the prior art devices. The fasteners of the instant invention can be easily adapted for a universal length through the thickness of the roof system. The fasteners of the instant invention provide an air seal to prevent air from entering the the hole in the deck, and finally, the fasteners of the instant invention provide a leak location mechanism utilizing the fasteners as the point of reference.

Thus, one object of the instant invention is to provide the simplest mechanism possible to provide the maximum holddown to maintain a deck system that is normally pierced by a fastener. A second object of the instant invention is to provide a non-corroadable fastener that can be used as a means of detecting leaks in a lamellar roof system, and a further object of this invention is to provide a detecting system for leaks that will allow for prohibition of air leakage from the interior of the building through the roof system to the outside because of the piercing of the laminates of the roof system. It should be noted that this device and method of securing roofs is especially useful for re-roofing over old lamellar roof systems because it allows one to re-insulate right over the old roof, apply an integral water impermeable membrane over the new insulation, and use the devices of the instant invention for fastening the whole into place over the old roof. This system allows one to reroof a building without tearing into the old roof.

These and other important objects will become evident to those skilled in the art by the reading and understanding of the instant specification and claims.

SUMMARY OF THE DRAWINGS

FIG. 4 is a cross sectional bottom view of FIG. 3 through the line B-B showing the configuration of the lower end of the ball containment chamber.

FIG. 5 is a full view of the fastening device with its upper flange and securing means.

FIG. 6 is a cross sectional side view of one of the devices of the instant invention in place in a new roof.

FIG. 7 is a top view of one grid pattern laid out on a roof to help determine the placement of the fasteners of this invention.

DETAILED DESCRIPTION OF THE DRAWINGS

One essential part of this invention is the anchor for the fastener of this invention in that, it contains the means to allow the fastener to impinge against the back surface of a workpiece and also it contains the novel means by which the water from a roof leak can escape to the interior of the building to indicate leakage while disallowing the escape of air from the interior of the building.

One novel part of the anchor is the standpipe containing a free floating spherical ball which in combination acts as a check valve within the fastener.

Figure 1:
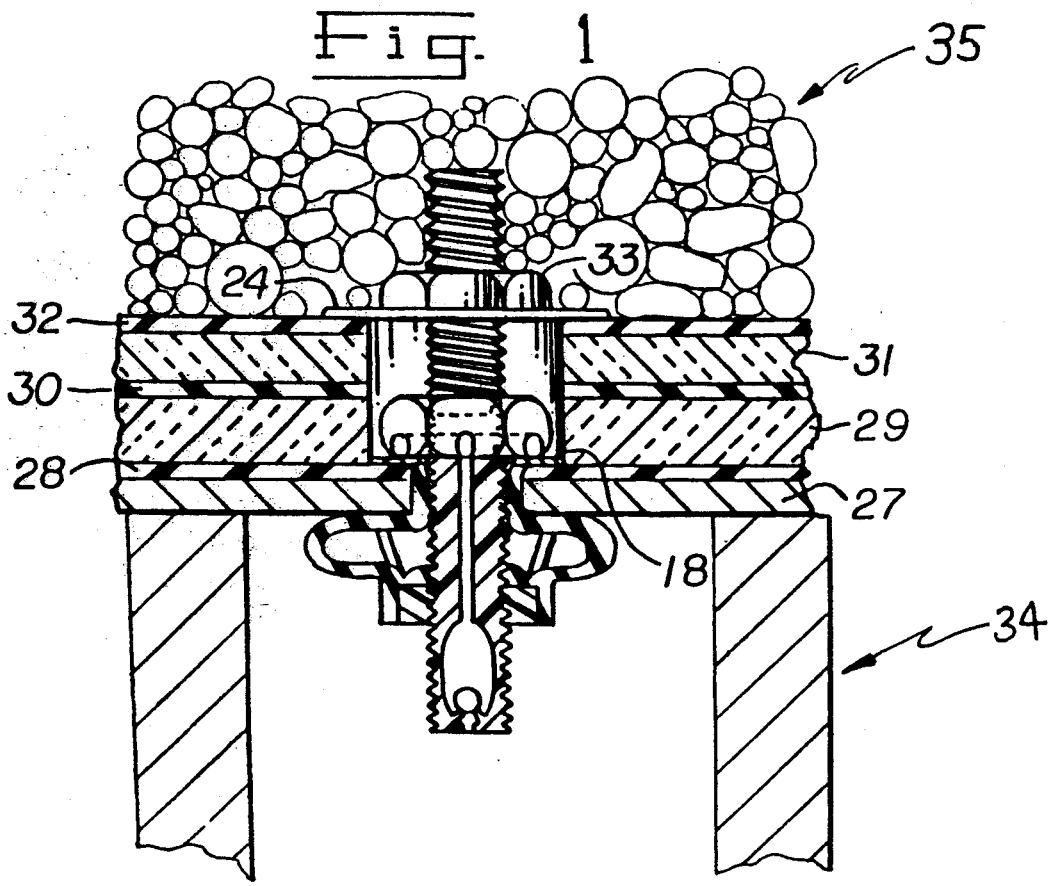
FIG. 1 is a cross sectional side view of one of the devices of the instant invention in place as a fastener for a new roof over an old roof.

FIG. 1 deals with a cross sectional side view of one of the devices of the instant invention in use to hold a new roof structure down over an old roof structure, and will be discussed infra.

Figures 2, 3:
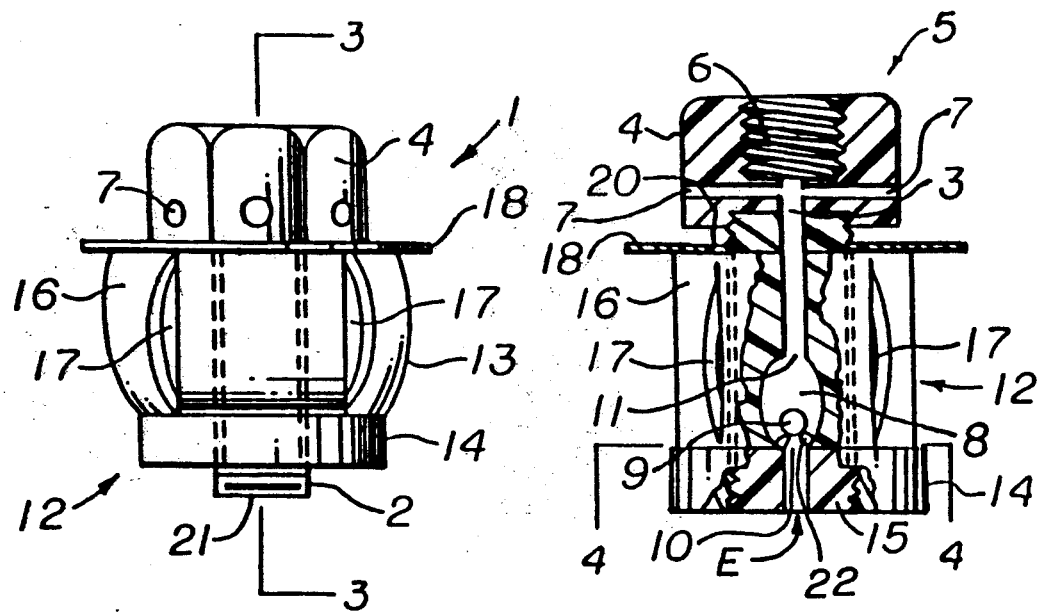
FIG. 2 is a full view of the standpipe of this invention.
FIG. 3 is a full cross sectional side view of the standpipe of FIG. 2 through the line A—A.

Turning to FIGS. 2 and 3 there is represented a full view of the standpipe 1 of this invention and a cross sectional view of the standpipe 1, respectively. The standpipe 1 comprises a bolt 2 threaded on its exterior surface. In addition, the bolt 2 has a small hollow bore 3 throughout its entire length and has on its upper end 5, a hub 4. The hub 4 has a threaded center bore 6 and has at least one small port 7 running laterally through its wall at its base. This port 7 joins interiorly with the small hollow bore 3 to form a continuous conduit running from the outside of the hub to the bottom end of the bolt 2 and exiting at point E. As noted from the FIG. 2 the ports 7 should be situated as near to the bottom of the hub 4 as is possible, in order not to create a substantial dam for any water that may approach the hub 4. It should be noted at this time that the flange 18 should also be as thin as is possible, again, in order not to create a substantial dam for any water which approaches the hub 4. As illustrated herein the flange 18 is shown as being quite thick in order to clarify the Figures, whereas, the intention of the inventor is that this flange will be on the order of the thickness of about one mil, more or less.

The small hollow bore 3 has at its end 10, a small enlargement 8 which contains a free floating ball 9. The lower end of the small enlargement 8 is configured with several small projections 22, which serve to hold the ball 9 from escaping from the small enlargement 8, and which also serves to prevent the ball 9 from coming to a rest and completely blocking off the exit E. FIG. 4 shows the approximate configuration of the small projections 22 in the bottom of the small enlargement 8. It will be recalled that FIG. 4 is a crossectional bottom view of the lower end of the small enlargement 8 through the line B—B of FIG. 3. The upper end 11 of the small enlargement 8 is configured to allow the ball to seat over the opening of the small hollow bore 3. In operation the flow of water that enters the ports 7 and moves by gravity down the small hollow bore 3, is allowed to pass the ball 9 and go to the exit at E. Whenever there is no water present to move the ball 9 from the seated position at 11, the ball 9 stays seated at 11 by the force of air moving from the interior of the building to the outside. The air that causes this phenomena is air that is part of the natural pressurized air that is brought in from the outside and used to supplement the air in the interior of the building. Since the air handling systems are designed to always maintain a positive pressure on the interior of the building, the ball 9 is forced upward into the opening at 11 and the ball 9 blocks the escape of air to the outside thus allowing a modicum of control of the pressurized air in the building and preventing the costly replacement of such air by the air handling system. It should be noted at this point that it is the intention of the inventor herein to provide the ports 7 and the small hollow bore 3 as a means of routing water to the exit E so that any water, which would not normally be present at the level in the roof where the hub 4 is located, would be directed out the exit E for observation from below the roof deck. This is necessary when the integrity of any of the water impervious membranes of the entire roof system have been broken and allow the entry of water therein. Further, because of the flow of water laden air to the roof from the interior of the building, water condenses and builds up in the layers of the roof and becomes a source of leaking water to the interior. With the fastening devices of this invention being the collection and transfer point of such undesirable water the location of the leak, and the extent of the break in the roof system can be determined and repaired.

Further, with reference to FIGS. 2 and 3 there can be seen a flexible catch 12 which is shown in FIG. 2 in the closed position, that is, the flexible catch 12 has been tightened onto the standpipe 1 by means of a threaded base 14 which will be discussed infra, causing the hollow flexible tube 16 to buckle and be compressed while in FIG. 3, the flexible catch 12 is shown in the open position, that is, the flexible catch 12 has not been tightened onto the standpipe 1 and the hollow flexible tube 16 is not buckled and compressed. The flexible catch 12 is comprised of the flexible hollow tube 16 which has a lower base 14. The flexible hollow tube 16 is manufactured from a flexible plastic material which can be deformed by merely turning the flexible catch 12 against the standpipe 1 such that the hollow flexible tube 16 is buckled and compressed, forming a broadened catch on the undersurface of the deck 27 (see FIGS. 1 or 6). Shown in both FIGS. 2 and 3 are several vertical openings 17 that have been precut in the walls 13 of the hollow tube 16 of the flexible catch 12, such that when the flexible catch 12 is turned onto the threaded standpipe 1, the walls 13 of the flexible catch 12 buckle and collapse and form a solid catch against the bottom of the deck of the roof and cause the anchor of this invention to become stabilized. The hollow tube 16 has a flange 18 layered and fixedly attached to its top end 19. The flange 18 has a center hole 20 having a diameter approximating the diameter of the bolt 2 of the standpipe 1 in order to allow the passage of the bolt 2 of the standpipe 1 therethrough.

The combination of the standpipe 1 the flexible catch 12 and the free floating ball 9 constitute the anchor for the inventive fastener of this disclosure.

Thus, the fastener of this invention comprises in combination the standpipe 1, the free floating spherical ball 9, the flexible catch 12, an extension shaft 23 (see FIG. 5) and a means 26 for fastening the extension shaft 23 for holding the fastener in place.

The extension shaft 23 is a durable post, preferrably dense plastic such as polyethylene or polypropylene, threaded on its exterior surface to accomodate the fastening means 26, and the whole is stabilized in a roof system by surmounting and threading onto the extension shaft 23, over a top flange 24, the fastening means 26.

The fastener of this invention when fully assembled is shown in FIG. 5 wherein there is shown the base 14, the threaded bolt 2 of the standpipe 1, the flexible catch 12 with the buckled and compressed wall 13, the flange 18, the hub 4 with the small ports 7, the extension shaft 23, the top flange 24, and a threaded nut 26.

FIG. 6 is a cross sectional side view of one of the devices of the instant invention in place in a new roof, the new roof comprising a roof deck 27, a water impervious membrane 28, insulation layer 31, and the water impervious roof covering 32.

FIG. 1 is a cross sectional side view of one of the devices of the instant invention in place as a fastener for a new roof over an old roof in which there is shown the roof deck 27, a water impervious membrane 28, insulation 29 and roof covering 30, all of the old roof, while the new roof comprises insulation layer 31, and new water impervious roof covering 32.

The instant invention is found to be very useful in repairing old roofs, as methods in the current practice include removing the old roof completely; finding the source of leaks in the roof and dismantle the roof in part; or completely re-covering the old roof system with a new roof system.

The devices of the instant invention have the advantage that they can be used to repair old roof systems by re-covering the old roof system, by utilizing these devices to secure the new roof, the advantage being that the old roof does not have to be destroyed and the new roof can be layed down over the old roof without significant labor. Further, after the devices of the instant invention are used in the replacement or repair of a roof system, they are then useful as a detector means for detecting leaks in the roof system. Still further, once the devices of the instant invention have been installed in a roof system, they can be used for latent repair, or for the installation of new roofs over old roofs, without significant replacement of such earlier devices.

In the method of using the fastener of this invention, wherein essentially the same method can be used over old or new roofs, the top layer, i.e. the deck of a new roof, or the top layer of an already existing roof, is typically measured and laid out in a grid of some type so that the devices of the instant invention can be used at their optimum, such as that shown for example in FIG. 7. The design of these devices allows them to have more holding strength than the devices that have been used in the prior art, and one could use them sparingly on a roof system to hold such a roof system in place. However, it is expedient to use a grid system for the lay out of the placement of these devices, because such a grid, being essentially uniform, acts as a means by which one can easily trace the leaks in a roof system, and as indicated supra, the holding strength can be enhanced even when the devices of this invention are spread further apart on a roof structure which means that less of them have to be used on a roof structure with the end result that such pre-planning of the placement of the devices gives a cost savings to the roof project.

At the intersection of each of the cross lines of the grid such as that shown at point b/3 of FIG. 7, as discussed supra relative to the placement of the standpipe 1, there is a hole drilled through the roof deck. The hole should be of such a diameter that the flexible catch 12 of this invention in its non-buckled or non-compressed form will slide through the hole, it being preferred that the fit of the flexible catch 12 in its uncompressed state be fairly snug in the drilled hole. The flexible catch 12 is surmounted by a flange 18 which is larger in diameter than the flexible catch 12, and the flexible catch 12 is inserted into the hole whereby the flange 18, which is fixed to the top of the flexible catch 12, catches on the metal deck and temporarily supports the flexible catch 12 in the hole. Then the standpipe 1, is inserted through the center hole 20 in the flange 18 and pushed down until it contacts the threaded base 14 of the flexible catch 12. The bolt 2 of the standpipe 1, by use of the hexagonal hub 4 is then screwed into the threaded base 14, whereupon the flexible catch 12 buckles and compresses, and provides a solid catch against the bottom of the deck, the standpipe 1 being turned into the flexible catch 12 until the entire assembly is unmovable in the hole. A flexible shaft 23, having the length required for the particular roof being assembled, is inserted into the top hub 4 of the standpipe and the shaft is turned in tightly and seated in the hub. The required additional roof layers, for example insulation layers are added so that holes in such materials are provided for seating over the flexible shafts 23, or the corners of such layers meet at each shaft and essentially surround it, the latter method being preferred. Thereafter, the top most layers of the roof system are put into place, each shaft 23 is provided with a flange or plate 24, and a threaded nut 33 is turned down over the flange 24 to stabilize the fastener and the roof system.

When these devices are put into place in the fashion described above, there is provided a strong roof. It should be noted by those skilled in the art that the instant invention is not limited to any particular size of the device. The size of the device should be determined using acceptable engineering techniques and calculations, and should be acclamated to the type and size of the roof system being installed. This determination is well within the capability of those skilled in the art and does not have to be set forth in detail in this specification.

All fasteners have some of these attributes claimed for the device of the instant invention. None of the prior art fasteners have the combination of the air seal and leak locater nor the combination of the other advantages and benefits of the instant invention devices and methods.

The fasteners of the instant invention can be manufactured from various materials such as dense thermoset plastics, ferrous alloys, ferrous alloys with coatings to protect the alloys, corrosion resistant ferrous materials, such as stainless steel and Monel ®, aluminum, which tends to provide protection via galvanic action, and, thermoplastic polymers, reinforced versions of thermoset and thermoplastic polymers, and crosslinked versions of the plastic polymers, are all applicable in the instant invention. Preferred are the plastic materials because they have the highest resistance to corrosion and highly acceptable strength requirements.

It should be noted by those skilled in the art that if a roof system is installed using the novel devices of the instant invention, and then some time later, the roof has to be repaired or replaced such that a new covering or coverings have to be installed over the old roof, the anchor of the device can be reused. One simply removes the top threaded nut 33 along with the gasket 24, removes the flexible shaft 23, reinserts a new, longer flexible shaft 23 to accomodate the newly added layers, replaces the gasket 24 and the top threaded nut 33, without doing anything more.

Thus it can be observed that the device of the instant invention provides advantages and benefits that heretofor have not been available to the public.

What is claimed is:

1. A method of securing a multiple layered roof, the method comprising the steps of
   (I) providing a roof support means;
   (II) surmounting the roof support means with a roof deck;
   (III) surmounting the roof deck with a water impermeable membrane, said membrane having a generally flat surface coextensive with the roof deck;
   (IV) securing to the roof deck, a fastener comprising in combination
      a standpipe,
      a free floating spherical ball,
      a flexible catch.
      an extension shaft, and
      a means for stabilizing the extension shaft and holding the fastener in place, wherein the standpipe comprises a bolt threaded on its exterior surface, said bolt having an upper end and a lower end and having a small hollow bore throughout its entire length and having fixedly attached on its upper end, a hub, said hub having a threaded center bore, said hub having at least one small port running laterally through its wall at its base and each said small port aligning with a second small port running laterally through the bolt and joining with the small hollow bore of the bolt to form a continuous conduit running from the outside of the hub to the bottom end of the bolt and exiting therefrom, said hollow bore having an upper end and an exiting end and having a widened portion just prior to its exiting end to contain said free floating spherical ball, said widened portion having an upper end configured to accomodate and nest the free floating ball, said widened portion having a lower end configured to prohibit the accomodation and nesting of the the free floating ball;

the flexible catch comprising a lower base having a threaded center bore said base being surmounted by, and integrally molded with, a flexible hollow tube, said flexible hollow tube having at least two narrow, vertical openings in its wall, said hollow tube being layered by a thin gasket at its top end, which gasket is fixedly attached to the hollow tube, said gasket having a center hole having a diameter approximating the diameter of the bolt of the standpipe;

said flexible catch being movably mounted on the lower end of the bolt of the standpipe using the threaded center bore of its base such that turning the catch on the bolt compresses the flexible hollow tube;

an extension shaft, said extension shaft having a threaded diameter allowing insertion into, and threadable mating with, the hub of the standpipe and, the stabilizing means, by spacing a plurality of said fasteners over the area of the roof;

(V) surmounting the water impermeable membrane with planks of thermal insulation;

(VI) adjusting the fasteners downwardly to compress and secure the thermal insulating planks to hold them securely.

2. A method of repairing roofs comprising (I) removing any ballast layer from the area of the roof to be repaired;

(II) completing any required repairs (III) surmounting the repaired roof with a water impermeable membrane, said membrane having a generally flat surface coextensive with the roof deck;

(IV) securing the water impermeable membrane with one or more fasteners, said fasteners comprising in combination a standpipe,
a free floating spherical ball,
a flexible catch,
an extension shaft, and
a means for stabilizing the extension shaft and holding the fastener in place, wherein the standpipe comprises a bolt threaded on its exterior surface, said bolt having an upper end and a lower end and having a small hollow bore throughout its entire length and having fixedly attached on its upper end, a hub, said hub having a threaded center bore, said hub having at least one small port running laterally through its wall at its base and each said small port aligning with a second small port running laterally through the bolt and joining with the small hollow bore of the bolt to form a continuous conduit running from the outside of the hub to the bottom end of the bolt and exiting therefrom, said hollow bore having an upper end and an exiting end and having a widened portion just prior to its exiting end to contain said free floating spherical ball, said widened portion having an upper end configured to accomodate and nest the free floating ball, said widened portion having a lower end configured to prohibit the accomodation and nesting of the the free floating ball;

the flexible catch comprising a lower base having a threaded center bore said base being surmounted by, and integrally molded with, a flexible hollow tube, said flexible hollow tube having at least two narrow, vertical openings in its wall, said hollow tube being layered by a thin gasket at its top end, which gasket is fixedly attached to the hollow tube, said gasket having a center hole having a diameter approximating the diameter of the bolt of the standpipe;

said flexible catch being movably mounted on the lower end of the bolt of the standpipe using the threaded center bore of its base such that turning the catch on the bolt compresses the flexible hollow tube;

an extension shaft, said extension shaft having a threaded diameter allowing insertion into, and threadable mating with, the hub of the standpipe and, the stabilizing means, by spacing a plurality of said fasteners over the area of the roof;

(V) surmounting the water impermeable membrane with planks of thermal insulation;

(VI) adjusting the fasteners downwardly to compress and secure the thermal insulating planks to hold them securely.

3. A method of detecting leaks in a roof, the method comprising observing the presence of water, if any, at the bottom of one or more fasteners that have been utilized to fasten the roof in place, said fasteners comprising in combination a standpipe,
a free floating spherical ball,
a flexible catch,
an extension shaft, and
a means for stabilizing the extension shaft and holding the fastener in place, wherein the standpipe comprises a bolt threaded on its exterior surface, said bolt having a small hollow bore throughout its entire length and having fixedly attached on its upper end, a hub, said hub having a threaded center bore, said hub having at least one small port running laterally through its wall at its base and joining with the small hollow bore of the bolt to form a continuous conduit running from the outside of the hub to the bottom end of the bolt and exiting therefrom, said hollow bore having a widened portion just prior to its exiting end to contain said free floating spherical ball, the upper end of the widened portion configured to accomodate and nest the free floating ball, the lower end of the widened portion configured to prohibit the accomodation and nesting of the the free floating ball;

the flexible catch comprising a lower base having a threaded center bore said base being surmounted by, and integrally molded with, a flexible hollow tube, said flexible hollow tube having at least two narrow, vertical openings in its wall, said hollow tube being layered by a thin gasket at its top end, which gasket is fixedly attached to the hollow tube, said gasket having a center hole having a diameter approximating the diameter of the bolt of the standpipe;

an extension shaft, said extension shaft having a threaded diameter allowing insertion into, and threadable mating with, the hub of the standpipe and, the stabilizing means.

4. A method of repairing roofs comprising (I) removing any ballast layer from the area of the roof to be repaired;

(II) completing any required repairs;

(III) surmounting the repaired roof with a water impermeable membrane, said membrane having a generally flat surface coextensive with the roof deck;

(IV) securing the water impermeable membrane with one or more fasteners, said fasteners comprising in combination a standpipe,
a free floating spherical ball,
a flexible catch,
an extension shaft, and
a means for stabilizing the extension shaft and holding the fastener in place, wherein the standpipe comprises a bolt threaded on its exterior surface, said bolt having a small hollow bore throughout its entire length and having fixedly attached on its upper end, a hub, said hub having a threaded center bore, said hub having at least one small port running laterally through its wall at its base and joining with the small hollow bore of the bolt to form a continuous conduit running from the outside of the hub to the bottom end of the bolt and exiting therefrom, said hollow bore having a widened portion just prior to its exiting end to contain said free floating spherical ball, the upper end of the widened portion configured to accomodate and nest the free floating ball, the lower end of the widened portion configured to prohibit the accomodation and nesting of the the free floating ball;

the flexible catch comprising a lower base having a threaded center bore said base being surmounted by, and integrally molded with, a flexible hollow tube, said flexible hollow tube having at least two narrow, vertical openings in its wall, said hollow tube being layered by a thin gasket at its top end, which gasket is fixedly attached to the hollow tube, said gasket having a center hole having a diameter approximating the diameter of the bolt of the standpipe;

an extension shaft, said extension shaft having a threaded diameter allowing insertion into, and threadable mating with, the hub of the standpipe and, the stabilizing means, by spacing a plurality of said fasteners over the area of the roof;

(V) surmounting the water impermeable membrane with planks of thermal insulation;

(VI) adjusting the fasteners downwardly to compress and secure the thermal insulating planks to hold them securely;

(VII) covering the thermal insulating planks with a layer of ballast.

* * * * *